W. THUNEN.
Vehicle-Wheel.
No. 205,318.   Patented June 25, 1878.
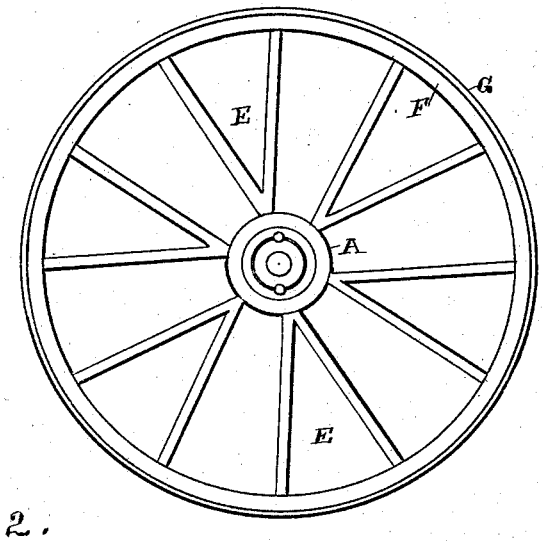
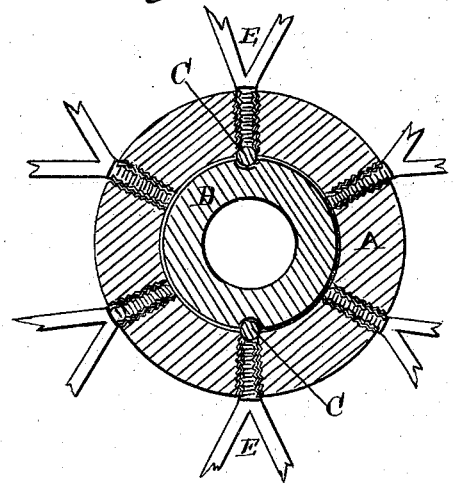
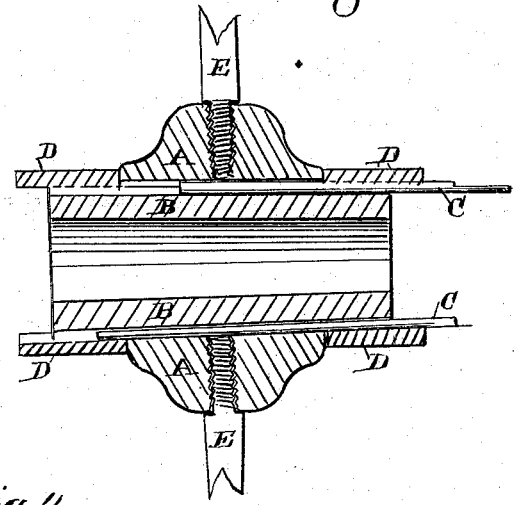
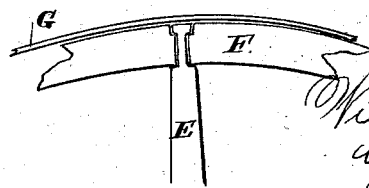
Witnesses
Geo. H. Strong
Frank A. Brooks
Inventor
William Thunen
by Dewey & Co.
Attys

UNITED STATES PATENT OFFICE.

WILLIAM THUNEN, OF CHEROKEE, CALIFORNIA.

IMPROVEMENT IN VEHICLE-WHEELS.

Specification forming part of Letters Patent No. 205,318, dated June 25, 1878; application filed May 6, 1878.

*To all whom it may concern:*

Be it known that I, WILLIAM THUNEN, of Cherokee, county of Butte, and State of California, have invented an Improved Carriage-Wheel; and I do hereby declare the following to be a full, clear, and exact description thereof, reference being had to the accompanying drawings.

My invention relates to improvements in the construction of carriage-wheels; and consists in forming the spokes in a forked shape, so that each pair of spokes only requires one hole in the hub, said spokes being formed of wrought-iron, and the outer ends riveted in the wrought-iron felly, while the inner ends are screwed into the cast-iron hub.

It also consists in projecting wrought-iron bands shrunk on the ends of the axle-box, in combination with the hub and keys to secure the hub and box together.

It also consists in the use of a metal felly formed in one piece, with countersunk holes, in which the spokes are riveted. The box and tire are made removable, so that new ones may be substituted when they are worn out.

Referring to the accompanying drawings, Figure 1 is a view of my wheel. Figs. 2 and 3 are enlarged views of the hub in section; Fig. 4, an enlarged view of the felly.

The hub A of my wheel is made of metal, preferably of cast-iron, for economical reasons. The box B is made separate from the hub, and is held in place by the keys C, which may be formed on the box and engage with slots on the inner part of the hub; or the keys may be made separate, and engage in slots in both box and interior of hub, thus keeping the box in place. When the box B is in place, wrought-iron bands D are shrunk over the ends of the box, retaining it in position and protecting the nut and shoulder of the axle from the mud and sand which may fall from the wheel. Usually two of the keys C are used to keep the box from turning in the hub.

The spokes E are made in a peculiar shape, as shown. This forked shape is adopted so that fewer holes need be made in the hub. With a hole for every spoke in the hub the casting would be weakened, or else it would have to be made so heavy as to be impracticable for use. These spokes are made of gas-pipe, and have only solid iron enough welded in each end to fasten them with. The end of the forked spoke which enters the hub has threads cut upon it, so as to be screwed into the holes in the hub.

The rim or felly F, I make all in one piece, and in it are formed countersunk holes for the spokes. Shoulders are formed in the spokes on the inside of the felly, as in ordinary wheels, and after the spokes are all inserted in the felly they are riveted in place by being upset on the outer ends. The riveted ends set in the countersunk portion of the hole in the felly effectually fasten the spokes to the felly in the firmest possible manner.

In order to put the felly in place in one piece, in constructing my wheel, after I get the spokes E screwed in the hub I cut the piece of metal forming the felly of the right length, bend it, and bevel the ends for a splice. I fasten these ends with a rivet, bore the spoke-holes, and countersink them, and then I lay the felly on the spokes and mark them at the inside of the felly. The spokes are then filed or turned down to fit the holes, with a shoulder at the inside of the felly, in the usual manner. Now I cut the rivet out of the felly again, and spring the spokes in their places by means of a pair of clip-tongs, and rivet them in the countersunk holes, upsetting their ends. When all the spokes are riveted I put a rivet in the splice in the felly F and weld it. A tire, G, is then put on the wheel to save wear on the felly, a few tire-bolts being necessary to keep it in place in case it should heat and expand by friction.

I thus form entirely of metal a light and strong wheel for vehicles, which can be easily constructed and which is very durable. Being all made of metal, ordinary climatic changes do not affect it; and in case of any loosening in the felly, which is not apt to happen, the tire may be removed and the spokes riveted together.

In case the box in the hub should wear out, it can be removed by cutting the wrought-iron hub-band D with a cold chisel, and a new one substituted. In fact, the only things to wear out on this wheel are the boxes and tires, and they may be easily replaced. The spokes, being screwed into the hub, are not apt to get loose, and they are held tightly in the felly by means of the shoulder on one side and rivet on the other. In case a spoke should get broken, it can be removed and a new one substituted without injury to the wheel. There being only half the number of holes in the hub that there are spokes, the hub can be made light, and it is not weakened by being cut all away. A set of wheels made on this principle, with hubs five inches in diameter, and fourteen spokes of half-inch gas-pipe, measuring seven-eighths inch in diameter on the outside, with felly an inch and a quarter by three-eighths inch and tire the same, will carry a ton weight over an ordinary road, and never wear out by keeping the boxes and tires renewed.

Having thus described my invention, what I claim as new, and desire to secure by Letters Patent, is—

1. The metal hub A and the entire metal felly F, with its countersunk holes to receive the ends of the spokes, in combination with the two-part forked spokes E, having the single stem to enter the hub, substantially as herein described.

2. The cast-metal hub A, having the removable interior box B, and the keys C, in combination with the projecting wrought-hands D, shrunk upon the ends of the box, substantially as herein described.

3. The wheel consisting of the hub A, with its removable box B, keys C, and exterior box-bands D, in combination with the forked spokes E, riveted into the felly F, and the exterior protecting-tire G, substantially as herein described.

In witness whereof I hereunto set my hand.

WILLIAM THUNEN.

Witnesses:
GEORGE BERRY,
JOHN McBETH.